(12) United States Patent
Chung et al.

(10) Patent No.: US 11,494,614 B2
(45) Date of Patent: Nov. 8, 2022

(54) SUBSAMPLING TRAINING DATA DURING ARTIFICIAL NEURAL NETWORK TRAINING

(71) Applicant: Microsoft Technology Licensing, LLC, Redmond, WA (US)

(72) Inventors: Eric S. Chung, Redmond, WA (US); Douglas C. Burger, Redmond, WA (US); Bita Darvish Rouhani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 16/359,663

(22) Filed: Mar. 20, 2019

(65) Prior Publication Data
US 2020/0302273 A1    Sep. 24, 2020

(51) Int. Cl.
*G06N 3/04* (2006.01)
*G06F 17/16* (2006.01)
*G06K 9/62* (2022.01)

(52) U.S. Cl.
CPC .......... *G06N 3/0472* (2013.01); *G06F 17/16* (2013.01); *G06K 9/6267* (2013.01); *G06N 3/0481* (2013.01)

(58) Field of Classification Search
CPC .... G06N 3/0472; G06N 3/0481; G06F 17/16; G06K 9/6267
USPC ......................................................... 706/20
See application file for complete search history.

(56) References Cited

U.S. PATENT DOCUMENTS

| | | | |
|---|---|---|---|
| 2017/0235824 A1* | 8/2017 | Liu | G06Q 20/10 707/723 |
| 2018/0114108 A1* | 4/2018 | Lao | G06N 3/006 |

OTHER PUBLICATIONS

Xu, et al., "Efficient subsampling fortraining complex language models", Proceedings of the 2011 Conference on Empirical Methods in Natural Language Processing, pp. 1128-1136 (Year: 2011).*
Mikolov, et al., "Strategies for training large scale neural network language models", 2011 IEEE Workshop on Automatic Speech Recognition & Understanding (Year: 2011).*
Bendelac, Shiri, "Enhanced Neural Network Training Using Selective Backpropagation and Forward Propagation", In Thesis submitted to the Faculty of the Virginia Polytechnic Institute and State University, May 7, 2018, 97 Pages.
(Continued)

*Primary Examiner* — Tsu-Chang Lee
(74) *Attorney, Agent, or Firm* — Newport IP, LLC; Leonard J. Hope

(57) ABSTRACT

Perplexity scores are computed for training data samples during ANN training. Perplexity scores can be computed as a divergence between data defining a class associated with a current training data sample and a probability vector generated by the ANN model. Perplexity scores can alternately be computed by learning a probability density function ("PDF") fitting activation maps generated by an ANN model during training. A perplexity score can then be computed for a current training data sample by computing a probability for the current training data sample based on the PDF. If the perplexity score for a training data sample is lower than a threshold, the training data sample is removed from the training data set so that it will not be utilized for training during subsequent epochs. Training of the ANN model continues following the removal of training data samples from the training data set.

17 Claims, 8 Drawing Sheets

(56) References Cited

OTHER PUBLICATIONS

Katharopoulos, et al., "Not All Samples Are Created Equal: Deep Learning with Importance Sampling", In Journal of Computing Research Repository, Jun. 9, 2018, 13 Pages.
"International Search Report and Written Opinion Issued in PCT Application No. PCT/US20/022507", dated Date Jun. 18, 2020, 14 Pages.
Wang, et al., "Data Dropout: Optimizing Training Data for Convolutional Neural Network", In Proceedings of the IEEE 30th International Conference on Tools with Artificial Intelligence (ICTAI), Nov. 5, 2018, pp. 39-46.
Zhou, et al., "Learning Deep Features for Discriminative Localization", In Proceedings of the IEEE Conference on Computer Vision and Pattern Recognition (CVPR), Jun. 27, 2016, pp. 2921-2929.

\* cited by examiner

SUBSAMPLING TRAINING DATA DURING ARTIFICIAL NEURAL NETWORK TRAINING

BACKGROUND

Artificial neural networks ("ANNs" or "NNs") are applied to a number of applications in Artificial Intelligence ("AI") and Machine Learning ("ML"), including image recognition, speech recognition, search engines, and other suitable applications. ANNs are typically trained across multiple "epochs." In each epoch, an ANN trains over all of the training data in a training data set in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights," to produce an input for the next layer. The output of the last layer, commonly referred to as the "output layer," is a class prediction, commonly implemented as a vector indicating the probabilities that the sample is a member of a number of classes. Based on the label predicted by the ANN and the actual label of each instance of training data, the output layer computes a "loss," or error function.

In a "backward pass" (which might also be referred to herein as a "backward training pass") of the ANN, each layer of the ANN computes the error for the previous layer and the gradients, or updates, to the weights of the layer that move the ANN's prediction toward the desired output. The result of training a ANN is a set of weights, or "kernels," that represent a transform function that can be applied to an input with the result being a classification, or semantically labeled output.

After an ANN is trained, the trained ANN can be used to classify new data. Specifically, a trained ANN model can use weights and biases computed during training to perform tasks (e.g. classification and recognition) on data other than that used to train the ANN. General purpose central processing units ("CPUs"), special purpose processors (e.g. graphics processing units ("GPUs")), and other types of hardware can be used to execute an ANN model.

Training an ANN in the manner described above can consume significant computing resources including, memory, processor cycles, network bandwidth, and power. This is particularly true for training data sets that include large numbers of training data samples.

It is with respect to these and other technical challenges that the disclosure made herein is presented.

SUMMARY

Technologies are disclosed herein for subsampling training data during ANN training. Through implementations of the disclosed technologies, ANN models can be trained to a desired level of accuracy using a reduced number of training data samples, thereby reducing training time. This can conserve computing resources including, but not limited to, memory, processor cycles, network bandwidth, and power. Other technical benefits can be realized through implementations of the disclosed technologies.

In order to provide the technical benefits mentioned above, and potentially others, perplexity scores can be computed for training data samples during ANN training. The perplexity scores indicate how "surprised" the ANN model is by a training data sample at a particular point in training. A perplexity score can be computed for some or all of the training data samples in a training data set following a forward training pass during each training epoch.

In one embodiment, the perplexity score is computed as a divergence between data (e.g. a one-hot vector) defining a class associated with the current training data sample and a probability vector (e.g. a probability vector generated by a SoftMax layer of the ANN) generated by the ANN model specifying probabilities that the current training data sample belongs to each of a plurality of classes (i.e. the output of the ANN model). In one example, the divergence is computed as a Kullback-Leibler divergence. Other types of divergence metrics can be utilized in other embodiments.

In another embodiment, the perplexity score is computed by first learning a probability density function ("PDF") fitting activation maps generated by an ANN model during training on training data samples previously used to train the ANN. A perplexity score can then be computed for a current training data sample by computing a probability for the current training data sample based on the PDF. The PDF might be a Gaussian PDF, a Gaussian Mixture Model PDF, or another type of PDF.

Once the perplexity score has been computed for a training data sample using either of the methods described above, a determination can be made as to whether the perplexity score is lower than a threshold. If the perplexity score is lower than the threshold for a training data sample, the training data sample is removed from the training data set so that it will not be utilized for training during subsequent epochs. In some embodiments, a further determination can be made as to whether the perplexity score for a training data sample is higher than a second threshold. If the perplexity score is higher than the second threshold for a training data sample, the training data sample is also removed from the training data set so that it will not be utilized for training during subsequent epochs. Training of the ANN model continues following the removal of training data samples from the training data set.

In some configurations, training data samples that were previously removed from the training data set can be periodically added back to the training data set. This might occur, for example, at the start of an epoch. This allows the perplexity score for training data samples to be re-computed following additional training of an ANN model.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
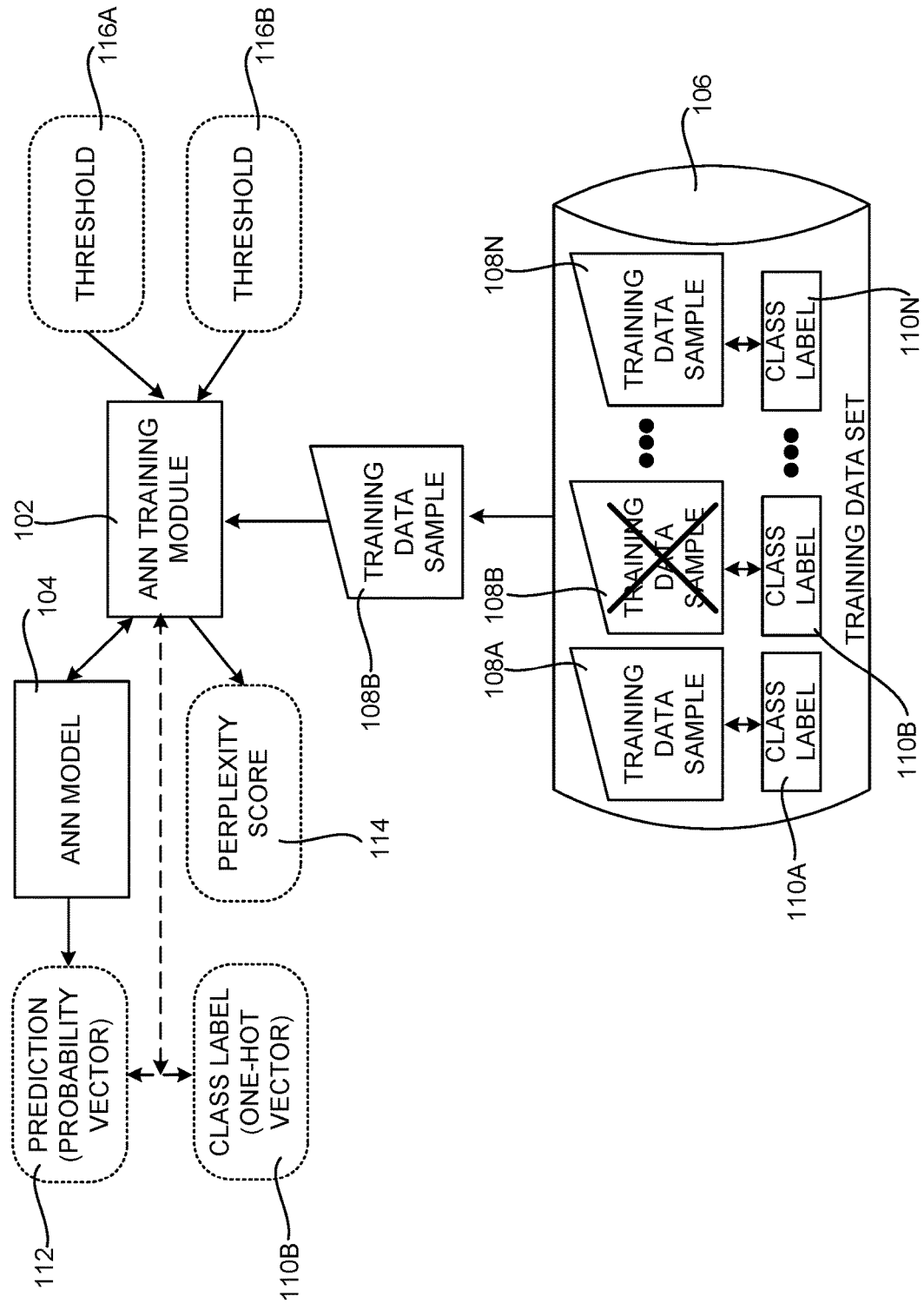
FIG. 1 is a computing architecture diagram that shows aspects of the configuration of a computing system disclosed herein for subsampling training data during ANN training, according to one embodiment disclosed herein.

The following detailed description is directed to technologies for subsampling training data during ANN training. In addition to other technical benefits, the disclosed technologies can train ANN models to a desired level of accuracy using a reduced number of training data samples. This can conserve computing resources including, but not limited to, memory, processor cycles, network bandwidth, and power. Other technical benefits not specifically identified herein can also be realized through implementations of the disclosed technologies.

Prior to describing the disclosed technologies for subsampling training data during ANN training, a brief overview of ANNs and ANN training will be provided. As described briefly above, ANNs are applied to a number of applications in AI and ML, including image recognition, speech recognition, search engines, and other suitable applications. An ANN generally consists of a sequence of layers of different types (e.g. convolution, ReLU, fully connected, and pooling layers). As will be described in greater detail below, NNs are typically trained using a labeled data set (e.g. a set of images that have been labeled with data describing the content in the images).

ANNs are typically trained across multiple "epochs." In each epoch, an ANN trains over all of the training data in a training data set in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights," to produce an input for the next layer. The output of the last layer, commonly referred to as the "output layer," is a class prediction, commonly implemented as a vector indicating the probabilities that the sample is a member of a number of classes. Based on the label predicted by the ANN and the actual label of each instance of training data, the output layer computes a "loss," or error function.

In a "backward pass" (which might also be referred to herein as a "backward training pass") of the ANN, each layer of the ANN computes the error for the previous layer and the gradients, or updates, to the weights of the layer that move the ANN's prediction toward the desired output. The result of training a ANN is a set of weights, or "kernels," that represent a transform function that can be applied to an input with the result being a classification, or semantically labeled output.

After an ANN is trained, the trained ANN can be used to classify new data. Specifically, a trained ANN model can use weights and biases computed during training to perform tasks (e.g. classification and recognition) on data other than that used to train the ANN. General purpose CPUs, special purpose processors (e.g. GPUs), and other types of hardware can be used to execute an ANN model.

In some examples, proprietary or open source libraries or frameworks are utilized to facilitate ANN creation, training, and evaluation. Examples of such libraries include, but are not limited to, TENSORFLOW, MICROSOFT COGNITIVE TOOLKIT ("CNTK"), CAFFE, THEANO, and KERAS. In some examples, programming tools such as integrated development environments ("IDEs") provide support for programmers and users to define, compile, and evaluate ANNs.

Tools such as those identified above can be used to define and use a ANN model. As one example, a modelling framework can include pre-defined application programming interfaces ("APIs") and/or programming primitives that can be used to specify one or more aspects of an ANN model. These pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth).

"Source code" can be used as an input to such a modelling framework to define a topology of the graph of a given ANN model. In particular, APIs of a modelling framework can be instantiated and interconnected using source code to specify a complex ANN model. Different ANN models can be defined by using different APIs, different numbers of APIs, and interconnecting the APIs in different ways.

Training data for training an ANN typically includes a set of input data (a "training data set") for applying to an ANN model and data describing a desired output from the ANN model for each respective sample of the training data. A modelling framework such as those described above can be used to train an ANN model with such training data.

As discussed briefly above, the output of ANN training is the weights and biases that are associated with each node of an ANN model. After the ANN model is trained, a modelling framework can be used to classify new data that is applied to the trained ANN model. Specifically, a trained ANN model uses the weights and biases obtained from training to perform classification, recognition, or other types of tasks on data that was not used to train the ANN model. Such a modelling framework can use special purpose processors (e.g. tensor processing units ("TPUs") or GPUs) to execute the ANN model with increased performance as compared to using only CPUs.

Referring now to the drawings, in which like numerals represent like elements throughout the several FIGS., aspects of various technologies for subsampling training data during ANN training will be described. In the following detailed description, references are made to the accompanying drawings that form a part hereof, and which are shown by way of illustration specific configurations or examples.

FIG. 1 is a computing architecture diagram that shows aspects of the configuration of a computing system disclosed herein for subsampling training data during ANN training, according to one embodiment disclosed herein. As shown in FIG. 1 and described briefly above, an ANN training module 102 can be configured to train an ANN model 104 in the manner described above. The ANN training module 102 might be provided by a modelling framework, such as those described above.

In the example configuration shown in FIG. 1, the ANN model 104 is being trained using training data samples 108A-108N (which might be referred to herein collectively as the "training data samples 108" or individually as "a training data sample 108") from a training data set 106. The training data samples 108 might be images, for example. Other types of training data can be utilized in other configurations.

As shown in FIG. 1, each of the training data samples 108A-108N has an associated class label 110A-110N (which might be referred to herein collectively as the "class labels 110" or individually as "a class label 110"), respectively. The class labels 110 are one-hot vectors that identify the true class of the associated training data sample 108. The class labels 110 can be implemented in other ways in other configurations.

As also shown in FIG. 1, the ANN training module 102 can compute perplexity scores for some or all of the training data samples 108 during each epoch such as, for example, following each forward training pass. In the example shown in FIG. 1, for instance, the ANN training module 102 has computed a perplexity score 114 for the training data sample 108B. The perplexity scores indicate how "surprised" the ANN model 104 is by a training data sample 108 at a particular point during training.

In one embodiment, the perplexity score 114 is computed as the divergence between data defining a class associated with a current training data sample 108 (e.g. a class label 110B) and a probability vector 112 (e.g. a probability vector generated by a SoftMax layer of the ANN model 104) generated by the ANN model 104 specifying probabilities that the current training data sample 108 belongs to each of a plurality of classes (i.e. the output of the ANN model 104). In one example, the divergence is computed as a Kullback-Leibler divergence. Other types of divergence metrics can be utilized in other embodiments.

Once the perplexity score 114 has been computed for a training data sample 108, the ANN training module 102 can determine whether the perplexity score 108 is lower than a threshold 116A. If the perplexity score 114 is lower than the threshold 116A for a training data sample 108, the ANN training module 102 removes the training data sample 108 from the training data set 106 so that it will not be utilized for training during subsequent epochs. In the example shown in FIG. 1, for instance, the training data sample 108B has been removed from the training data set 106.

In some embodiments, the ANN training module 102 can make a further determination as to whether the perplexity score 114 for a training data sample 108 is higher than a second threshold 116B. If the perplexity score 114 is higher than the second threshold 116B for a training data sample 108, the training data sample 108 is removed from the training data set 106 so that it will not be utilized for training during subsequent epochs. Training of the ANN model 102 continues following the removal of training data samples 108 from the training data set 106.

As described briefly above, the ANN training module 102 can periodically add training data samples 108 that were previously removed from the training data set 106 back to the training data 106 set in some configurations. This might occur, for example, at the start of an epoch. In the example shown in FIG. 1, for instance, the training data sample 108B might be added back to the training data set 106 following the completion of some number of epochs (e.g. 25). This allows the perplexity score 114 for previously removed training data samples 108 to be re-computed following additional training of an ANN model 104. Additional details regarding this process will be provided below with regard to FIG. 5B.

Figure 2:
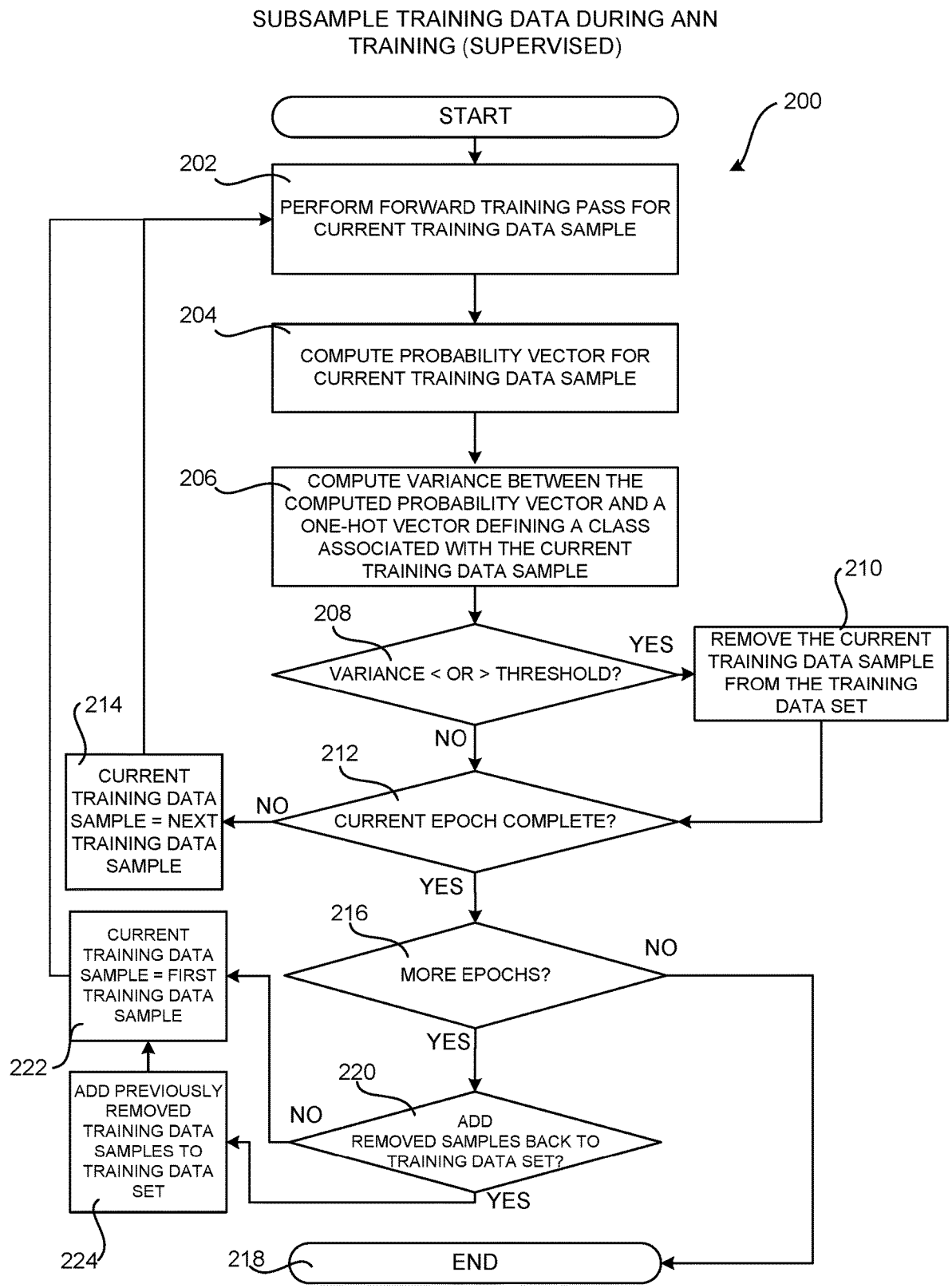
FIG. 2 is a flow diagram showing a routine that illustrates aspects of an illustrative computer-implemented process for subsampling training data during ANN training, according to the embodiment shown in FIG. 1.

Referring now to FIG. 2, a flow diagram showing a routine 200 will be described that shows aspects of an illustrative computer-implemented process for subsampling training data during ANN training. It should be appreciated that the logical operations described herein with regard to FIG. 2, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where the ANN training module 102 performs a forward training pass for a current training data sample 108 in the manner described above. The routine 200 then proceeds from operation 202 to operation 204, where the ANN training module 102 computes a probability vector 112 for the current training data sample 108. As discussed above, the probability vector 112 is generated by the ANN model 104 and specifies probabilities that the current training data sample 108 belongs to each of a plurality of classes (i.e. the output of the ANN model). The probability vector 112 is generated by a SoftMax layer of the ANN model 104 in some configurations.

From operation 204, the routine 200 proceeds to operation 206, where the ANN training module 102 computes the divergence between data defining a class associated with the current training data sample 108 (e.g. a one-hot vector identifying the true class of the training data sample 108) and the probability vector 112 for the current training data sample 10. In one example, the divergence is computed as a Kullback-Leibler divergence. Other types of divergence metrics can be utilized in other embodiments. The variance computed at operation 206 is the perplexity score 114 for the current training data sample 108 in this embodiment.

From operation 206, the routine 200 proceeds to operation 208, where the ANN training module 102 determines whether the perplexity score 114 computed at operation 206 is lower than a threshold 116A. If the perplexity score 114 for the current training data sample 108 is lower than the threshold 116A, the routine 200 proceeds to operation 210, where the ANN training module 102 removes the training data sample 108 from the training data set 106 so that it will not be utilized for training during subsequent epochs.

In some embodiments, the ANN training module 102 makes a further determination as to whether the perplexity score 114 for the current training data sample 108 is higher than a second threshold 116B. If the perplexity score 114 is higher than the second threshold 116B for the current training data sample 108, the routine 200 proceeds to operation 210, where the ANN training module 102 removes the current training data sample 108 from the training data set 106 so that it will not be utilized for training during subsequent epochs.

From operation 208, the routine 200 proceeds to operation 212, where the ANN training module 102 determines if the current the current epoch is complete. If not, the routine 200 proceeds from operation 212 to operation 214, where the ANN training module 102 obtains the next training data sample 108 and the process described above is repeated.

If the current training epoch is complete, the routine 200 proceeds from operation 212 to operation 216, where the ANN training module 102 determines if training is to continue for additional epochs. If not, the routine 200 proceeds from operation 216 to operation 218, where it ends.

If additional epochs remain, the routine 200 proceeds from operation 216 to operation 220, where the ANN training module 102 determines if training data samples 108 that were previously removed from the training data set 106 are to be added back to the training data set 105. If so, the routine 200 proceeds from operation 220 to operation 224, where training data samples 108 that were previously removed from the training data set 106 are returned to the training data set 106 for use in further training of the ANN model 104. If not, the routine 200 proceeds from operation 222, where the next epoch is started. Training then continues in the manner described above.

Figure 3:
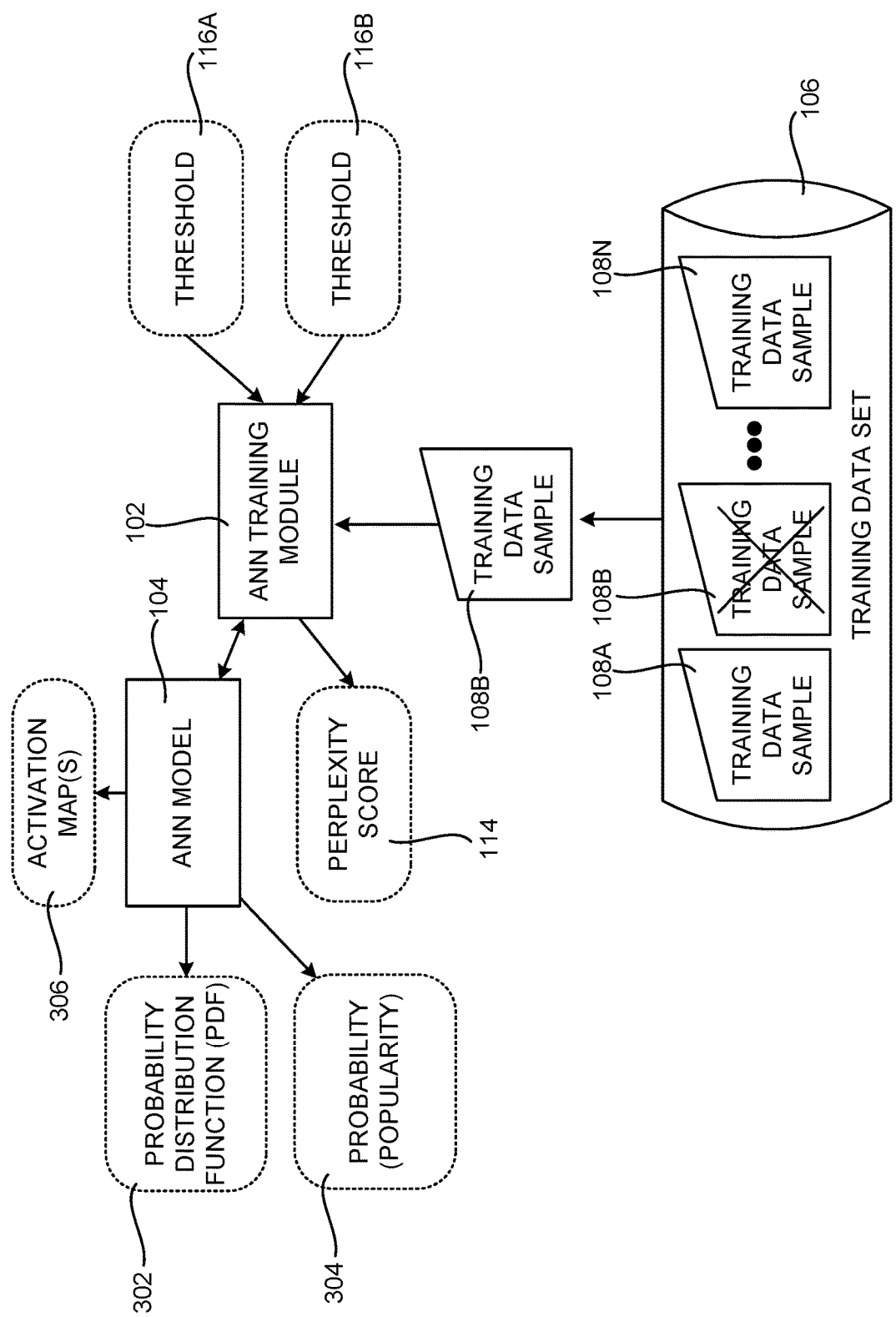
FIG. 3 is a computing architecture diagram that shows aspects of the configuration of a computing system disclosed herein for subsampling training data during ANN training, according to another embodiment disclosed herein.

FIG. 3 is a computing architecture diagram that shows aspects of the configuration of a computing system disclosed herein for subsampling training data during ANN training, according to another embodiment disclosed herein. In the embodiment illustrated in FIG. 3, the ANN training module 102 computes a perplexity score 114 for a current training data sample 108 by first learning a probability density function ("PDF") 302 fitting activation maps 306 generated by an ANN model 104 during training on training data samples 108 previously used to train the ANN model 104.

The ANN training module 102 can then compute a perplexity score 114 for a current training data sample 108 by computing a probability for the current training data 108 sample based on the PDF 302. The PDF 302 might be a Gaussian PDF, a Gaussian Mixture Model PDF, or another type of PDF.

In some configurations, the learned PDF 302 can be used to identify low-density regions in the activation maps 306. The identified low-density regions can be utilized to identify and collect new training data samples 108 that can help improve the accuracy of the ANN model 104.

Figure 4:
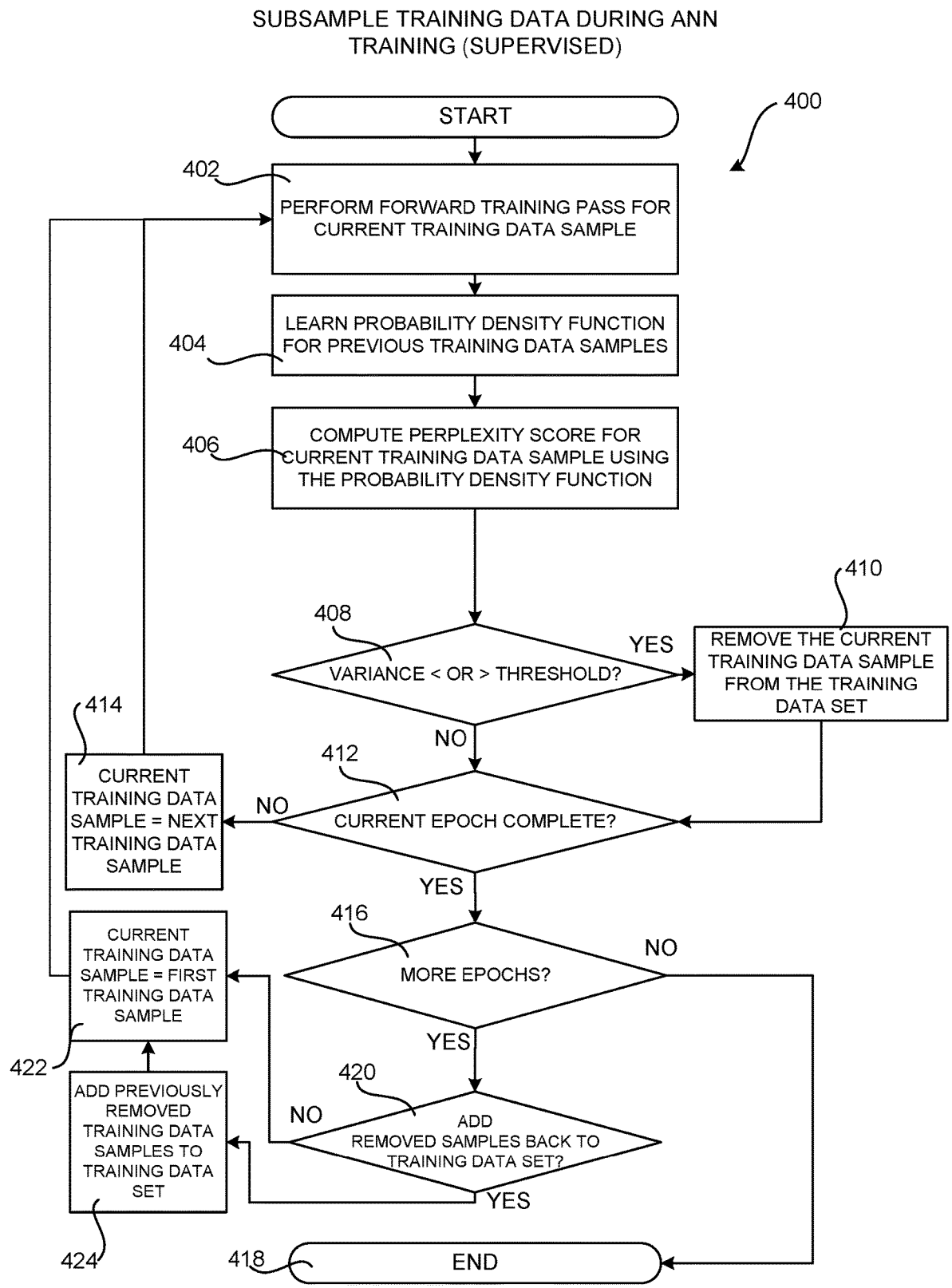
FIG. 4 is a flow diagram showing a routine that illustrates aspects of an illustrative computer-implemented process for subsampling training data during ANN training, according to the embodiment shown in FIG. 3.

FIG. 4 is a flow diagram showing a routine 400 that illustrates aspects of an illustrative computer-implemented process for subsampling training data during ANN training, according to the embodiment shown in FIG. 3. The routine 400 begins at operation 402, where the ANN training module 102 performs a forward training pass for a current training data sample 108 in the manner described above. The routine 400 then proceeds from operation 402 to operation 404, where the ANN training module 102 learns a PDF 302 that fits the activation maps 306 generated by the ANN model 104 while training. The routine 400 then proceeds from operation 404 to operation 406.

At operation 406, the ANN training module 102 computes the perplexity score 114 for the current training data sample 108 by computing a probability 304 of the current training data 108 sample based on the PDF 302. As discussed above, the PDF might be a Gaussian PDF, a Gaussian Mixture Model PDF, or another type of PDF.

From operation 406, the routine 400 proceeds to operation 408, where the ANN training module 102 determines whether the perplexity score 114 computed at operation 406 is lower than a threshold 116A. If the perplexity score 114 for the current training data sample 108 is lower than the threshold 116A, the routine 400 proceeds to operation 410, where the ANN training module 102 removes the training data sample 108 from the training data set 106 so that it will not be utilized for training during subsequent epochs.

In some embodiments, the ANN training module 102 makes a further determination as to whether the perplexity score 114 for the current training data sample 108 is higher than a second threshold 116B. If the perplexity score 114 is higher than the second threshold 116B for the current training data sample 108, the routine 400 proceeds to operation 410, where the ANN training module 102 removes the current training data sample 108 from the training data set 106 so that it will not be utilized for training during subsequent epochs.

If the perplexity score 114 is not lower or higher than the thresholds 116A and 116B, respectively, the routine 400 proceeds to operation 412, where the ANN training module 102 determines if the current the current epoch is complete. If not, the routine 400 proceeds from operation 412 to operation 414, where the ANN training module 102 obtains the next training data sample 108 and the process described above is repeated.

If the current training epoch is complete, the routine 400 proceeds from operation 412 to operation 416, where the ANN training module 102 determines if training is to continue for additional epochs. If not, the routine 400 proceeds from operation 416 to operation 418, where it ends.

If additional epochs remain, the routine 400 proceeds from operation 416 to operation 420, where the ANN training module 102 determines if training data samples 108 that were previously removed from the training data set 106 are to be added back to the training data set 105. If so, the routine 400 proceeds from operation 420 to operation 424, where training data samples 108 that were previously removed from the training data set 106 are returned to the training data set 106 for use in further training of the ANN model 104. If not, the routine 400 proceeds from operation 422, where the next epoch is started. Training then continues in the manner described above.

Figure 5A:
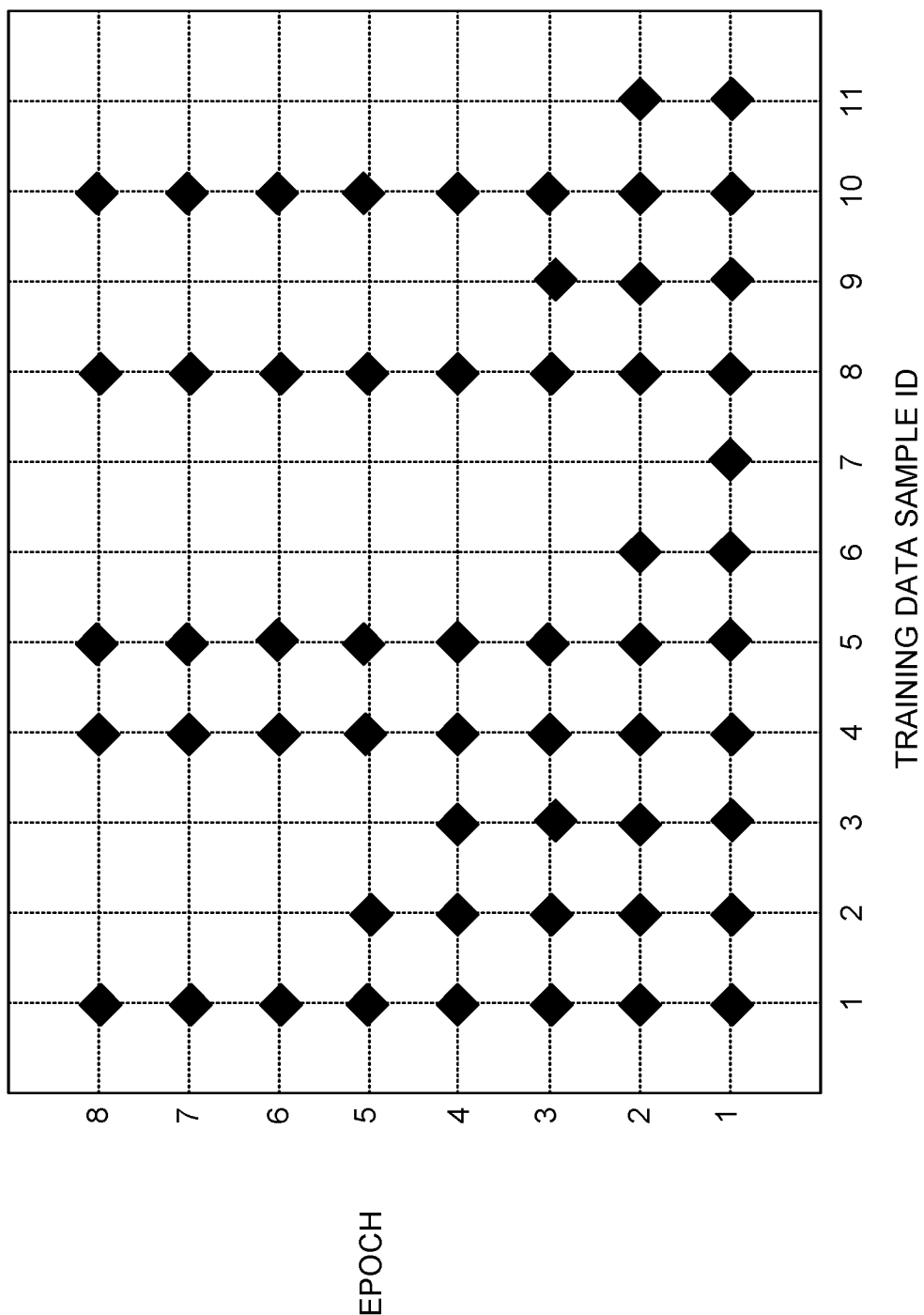
FIGS. 5A and 5B are bar graphs showing example results of the application of the technologies disclosed herein to a sample training data set.
Figure 5B:
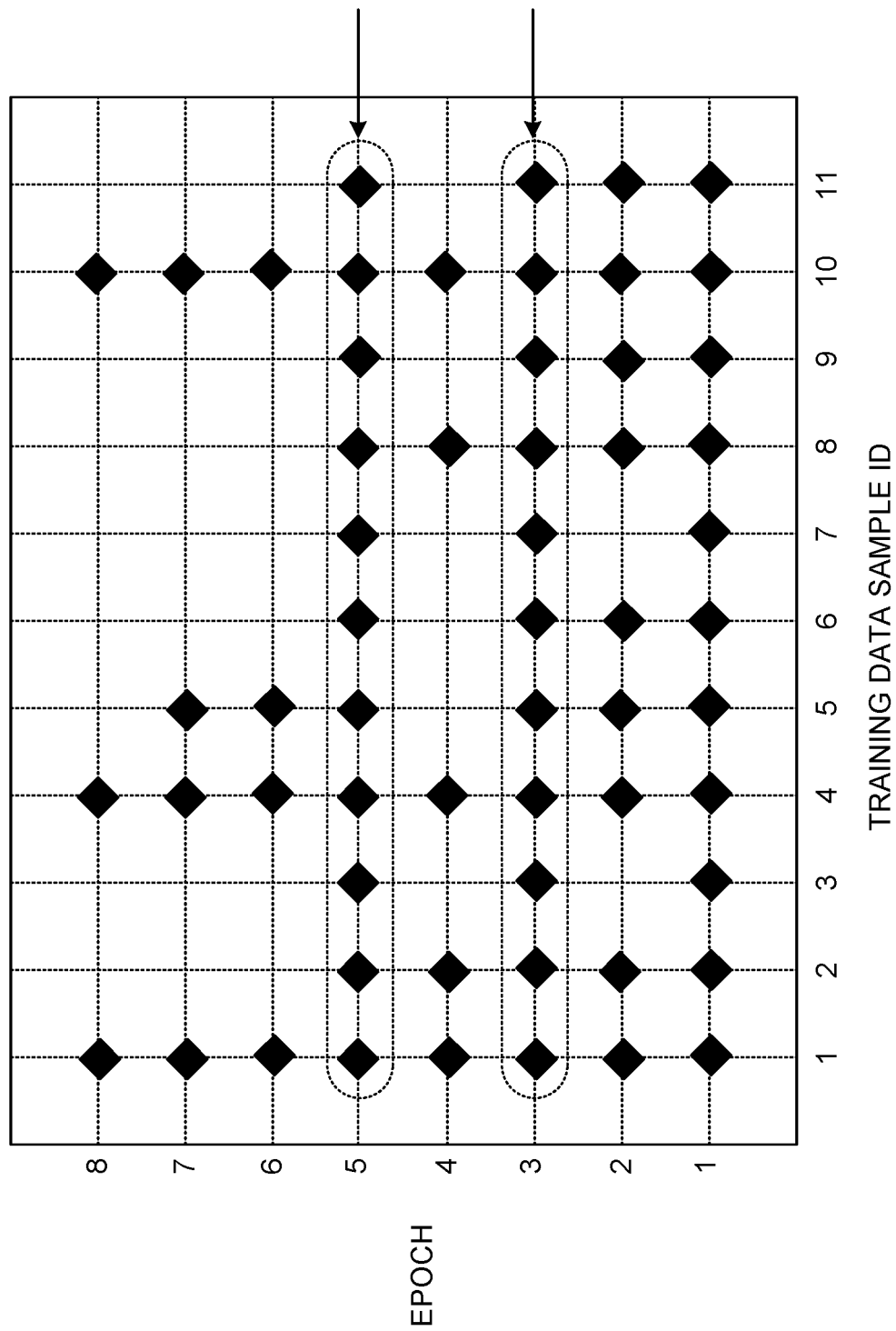

FIGS. 5A and 5B are bar graphs showing example results of the application of the technologies disclosed herein to a sample training data set 106. In the example illustrated in FIG. 5A, the sample training data set 106 includes eleven training data samples 108 (IDs 1-11) and training occurred over 8 epochs. A diamond in FIG. 5A indicates that a particular training data sample 108 was used for training during a particular epoch. For example, the diamond located at the intersection of the dashed lines corresponding to epoch 1 and training data sample ID 1 indicates that the training data sample 108 with the ID=1 was used for training during epoch 1.

As shown in FIG. 5A, all of the training data samples 108 in the illustrative training data set 106 were used for training during epoch 1. Following epoch 1, the training data sample 108 with the ID=7 was excluded from the training data set 106 based upon its perplexity score. Following epoch 2, the training data samples 108 with ID=6 was removed from the training data set 106. This process continues through epoch 8 in the manner described above, with various training data samples 108 being removed following each epoch.

As discussed above, training data samples 108 that were previously removed from the training data set can be periodically added back to the training data set 106 in some configurations. This might occur, for example, at the start of an epoch. This allows the perplexity score for training data samples 108 to be re-computed following additional training of an ANN model. This process is illustrated in FIG. 5B.

In the example shown in FIG. 5B, training data sample 108 with ID=7 was removed from the training data set 106 after epoch 7. However, this training data sample 108 was added back to the training data set 106 following epoch 2. Similarly, training data samples 108 having IDs=3, 5,6,7,9, and 10 were removed from the training data set 106 following epoch 3. These training data samples 108, however, were added back to the training data set 106 following epoch 4. In this example, previously excluded training data samples 108 have been added back to the training data set 106 prior to odd numbered epochs. However, previously excluded training data samples 108 might be added back to the training data set 106 at other times (e.g. after 10 epochs, after 50 epochs, etc.).

Figure 6:
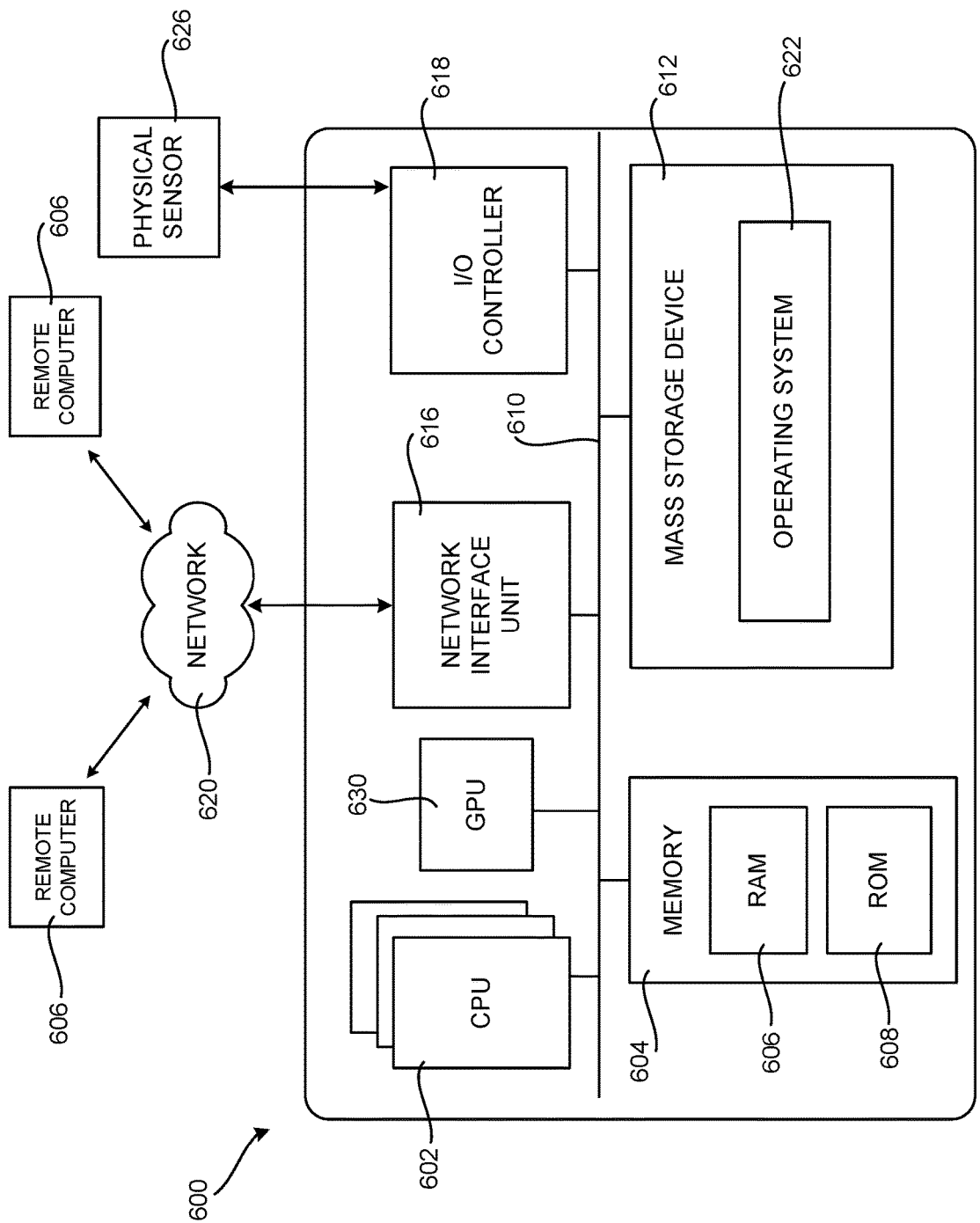
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing training of an ANN, those skilled in the art will recognize that other implementations can be performed in combination with other types of computing systems and modules. Those skilled in the art will also appreciate that the subject matter described herein can be practiced with other computer system configurations, including hand-held devices, multi-processor systems, microprocessor-based or programmable consumer electronics, computing or processing systems embedded in devices (such as wearable computing devices, automobiles, home automation etc.), minicomputers, mainframe computers, and the like.

The computer 600 illustrated in FIG. 6 includes one or more central processing units 602 ("CPU"), one or more GPUs 630, a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
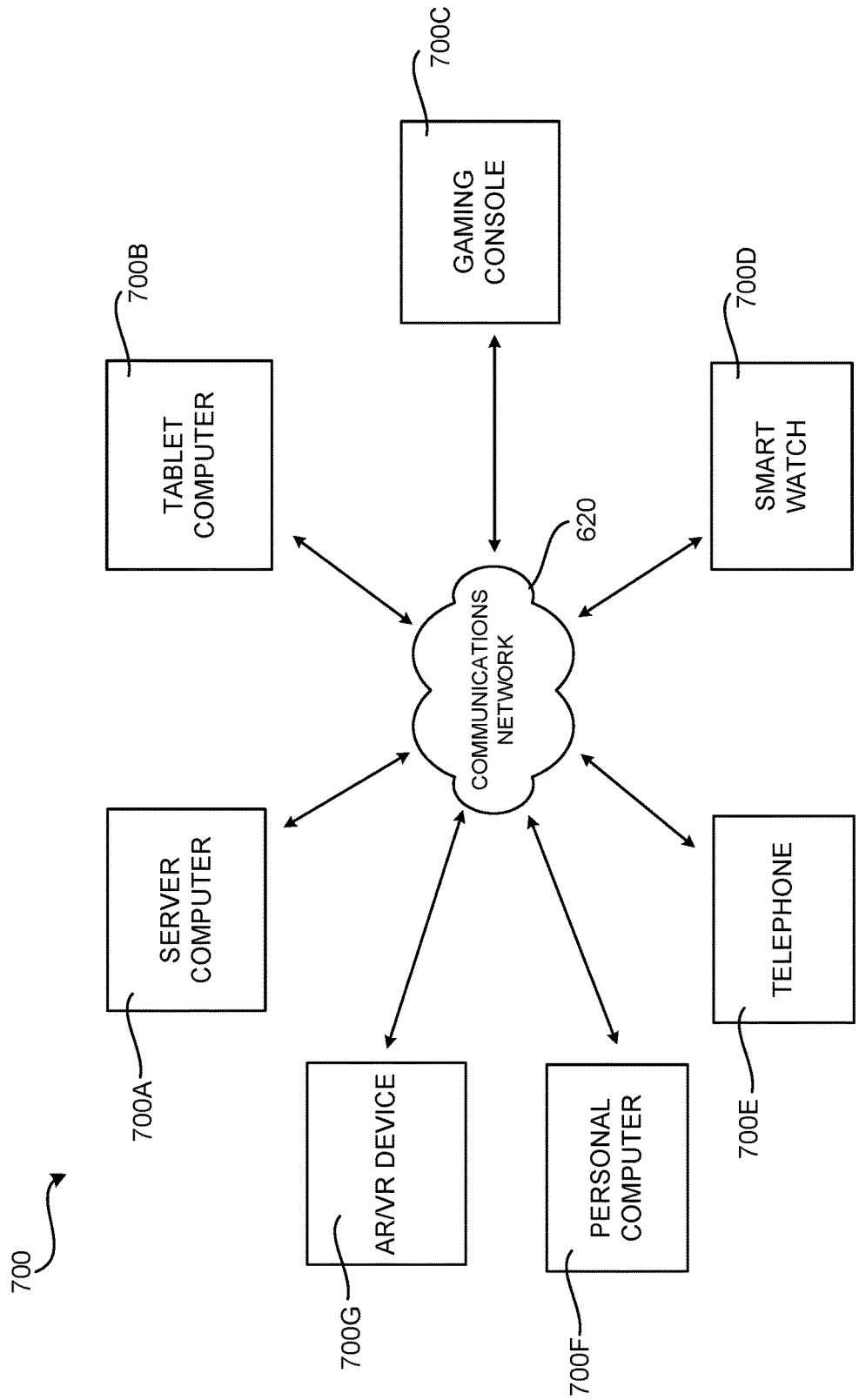
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various configurations presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 700A. This data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 7 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

Example 1: A computer-implemented method, comprising: following a forward training pass for an artificial neural network (ANN) model, computing a perplexity score for a current training data sample in a training data set, the perplexity score comprising a divergence between data defining a class associated with the current training data sample and a probability vector generated by the ANN model specifying probabilities that the current training data sample belongs to each of a plurality of classes, determining if the perplexity score is lower than a first threshold, removing the current training data sample from the training data set if the perplexity score is lower than the first threshold, and continuing training of the ANN model following the removal of the current training data sample from the training data set.

Example 2: The computer-implemented method of Example 1, further comprising: determining if the perplexity score is higher than a second threshold; and removing the current training data sample from the training data set if the perplexity score is higher than the second threshold.

Example 3: The computer-implemented method of Examples 1 and 2, further comprising prior to a start of an epoch for training the ANN model, adding training data samples previously removed from the training data set back to the training data set.

Example 4: The computer-implemented method of Examples 1-3, wherein the divergence comprises a Kullback-Leibler divergence.

Example 5: The computer-implemented method of Examples 1-4, wherein a SoftMax layer of the ANN generates the probability vector.

Example 6: The computer-implemented method of Examples 1-5, wherein the data defining the class associated with the current training data sample comprises a one-hot vector.

Example 7: The computer-implemented method of Examples 1-6, wherein the training data samples comprise images or text.

Example 8: A computer-implemented method, comprising: following a forward training pass for an artificial neural network (ANN) model, learning a probability density function (PDF) fitting activation maps generated by the ANN model during training on training data samples previously used to train the ANN, computing a perplexity score for a current training data sample in a training data set by computing a probability of a current training data sample based on the PDF, determining if the perplexity score is lower than a first threshold, removing the current training data sample from the training data set if the perplexity score is lower than the first threshold, and continuing training of the ANN model following the removal of the current training data sample from the training data set.

Example 9: The computer-implemented method of Example 8, further comprising: determining if the perplexity score is higher than a second threshold; and removing the current training data sample from the training data set if the perplexity score is higher than the second threshold.

Example 10: The computer-implemented method of Examples 8 and 9, further comprising prior to a start of an epoch for training the ANN, adding training data samples previously removed from the training data set back to the training data set.

Example 11: The computer-implemented method of Examples 8-10, wherein the training data samples comprise images or text.

Example 12: The computer-implemented method of Examples 8-11, wherein the PDF comprises a Gaussian Mixture Model PDF.

Example 13: The computer-implemented method of Examples 8-12, further comprising: identifying one or more low-density regions in the activation maps based on the PDF; and collecting additional training data samples for training the ANN model, the additional training data samples selected based upon the identified one or more low-density regions.

Example 14: A computing device, comprising: one or more processors; and at least one computer storage media having computer-executable instructions stored thereupon which, when executed by the one or more processors, will cause the computing device to: compute a perplexity score for a current training data sample in a training data set for training an artificial neural network (ANN) model, the perplexity score comprising a divergence between data defining a class associated with the current training data sample and data generated by the ANN model specifying probabilities that the current training data sample belongs to each of a plurality of classes, determine if the perplexity score is lower than a first threshold, remove the current training data sample from the training data set if the per- plexity score is lower than the first threshold, and continue training the ANN model following the removal of the current training data sample from the training data set.

Example 15: The computing device of Example 14, wherein the at least one computer storage medium has further computer-executable instructions stored thereupon to: determine if the perplexity score is higher than a second threshold; and remove the current training data sample from the training data set if the perplexity score is higher than the second threshold.

Example 16: The computing device of Examples 14 and 15, wherein the at least one computer storage medium has further computer-executable instructions stored thereupon to add training data samples previously removed from the training data set back to the training data set prior to a start of an epoch for training the ANN model.

Example 17: The computing device of Examples 14-16, wherein the divergence comprises a Kullback-Leibler divergence.

Example 18: The computing device of Examples 14-17, wherein a SoftMax layer of the ANN generates the probability vector.

Example 19: The computing device of Examples 14-18, wherein the data defining the class associated with the current training data sample comprises a one-hot vector.

Example 20: The computing device of Examples 14-19, wherein the training data samples comprise text or images.

Based on the foregoing, it should be appreciated that technologies for subsampling training data during ANN training have been disclosed herein. Although the subject matter presented herein has been described in language specific to computer structural features, methodological and transformative acts, specific computing machinery, and computer readable media, it is to be understood that the subject matter set forth in the appended Examples is not necessarily limited to the specific features, acts, or media described herein. Rather, the specific features, acts and mediums are disclosed as example forms of implementing the Example subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following Examples.

What is claimed is:

1. A computer-implemented method, comprising:
following a forward training pass for an artificial neural network (ANN) model for image recognition,
   computing a perplexity score for a current training data sample in a training data set comprising images, the perplexity score comprising a divergence between data defining a class associated with the current training data sample and a probability vector generated by the ANN model specifying probabilities that the current training data sample belongs to each of a plurality of classes,
   determining if the perplexity score is lower than a first threshold,
   removing the current training data sample from the training data set if the perplexity score is lower than the first threshold, and
   continuing training of the ANN model following the removal of the current training data sample from the training data set.

2. The computer-implemented method of claim 1, further comprising:
   determining if the perplexity score is higher than a second threshold; and
   removing the current training data sample from the training data set if the perplexity score is higher than the second threshold.

3. The computer-implemented method of claim 1, further comprising prior to a start of an epoch for training the ANN model, adding training data samples previously removed from the training data set back to the training data set.

4. The computer-implemented method of claim 1, wherein the divergence comprises a Kullback-Leibler divergence.

5. The computer-implemented method of claim 1, wherein a SoftMax layer of the ANN generates the probability vector.

6. The computer-implemented method of claim 1, wherein the data defining the class associated with the current training data sample comprises a one-hot vector.

7. A computer-implemented method, comprising:
following a forward training pass for an artificial neural network (ANN) model for image recognition,
   learning a probability density function (PDF) fitting activation maps generated by the ANN model during training on training data samples previously used to train the ANN,
   computing a perplexity score for a current training data sample in a training data set comprising images by computing a probability of a current training data sample based on the PDF,
   determining if the perplexity score is lower than a first threshold,
   removing the current training data sample from the training data set if the perplexity score is lower than the first threshold, and
   continuing training of the ANN model following the removal of the current training data sample from the training data set.

8. The computer-implemented method of claim 7, further comprising:
   determining if the perplexity score is higher than a second threshold; and
   removing the current training data sample from the training data set if the perplexity score is higher than the second threshold.

9. The computer-implemented method of claim 7, further comprising prior to a start of an epoch for training the ANN, adding training data samples previously removed from the training data set back to the training data set.

10. The computer-implemented method of claim 7, wherein the PDF comprises a Gaussian Mixture Model PDF.

11. The computer-implemented method of claim 7, further comprising:
   identifying one or more low-density regions in the activation maps based on the PDF; and
   collecting additional training data samples for training the ANN model, the additional training data samples selected based upon the identified one or more low-density regions.

12. A computing device, comprising:
one or more processors; and at least one computer storage media having computer-executable instructions stored thereupon which, when executed by the one or more processors, will cause the computing device to:
   compute a perplexity score for a current training data sample in a training data set comprising images for training an artificial neural network (ANN) model for image recognition, the perplexity score comprising a divergence between data defining a class associated with the current training data sample and data generated by the ANN model specifying probabilities that the current training data sample belongs to each of a plurality of classes,
   determine if the perplexity score is lower than a first threshold,
   remove the current training data sample from the training data set if the perplexity score is lower than the first threshold, and
   continue training the ANN model following the removal of the current training data sample from the training data set.

13. The computing device of claim 12, wherein the at least one computer storage medium has further computer-executable instructions stored thereupon to:
   determine if the perplexity score is higher than a second threshold; and
   remove the current training data sample from the training data set if the perplexity score is higher than the second threshold.

14. The computing device of claim 12, wherein the at least one computer storage medium has further computer-executable instructions stored thereupon to add training data samples previously removed from the training data set back to the training data set prior to a start of an epoch for training the ANN model.

15. The computing device of claim 12, wherein the divergence comprises a Kullback-Leibler divergence.

16. The computing device of claim 12, wherein a SoftMax layer of the ANN generates the probability vector.

17. The computing device of claim 12, wherein the data defining the class associated with the current training data sample comprises a one-hot vector.

* * * * *